Figure 1:
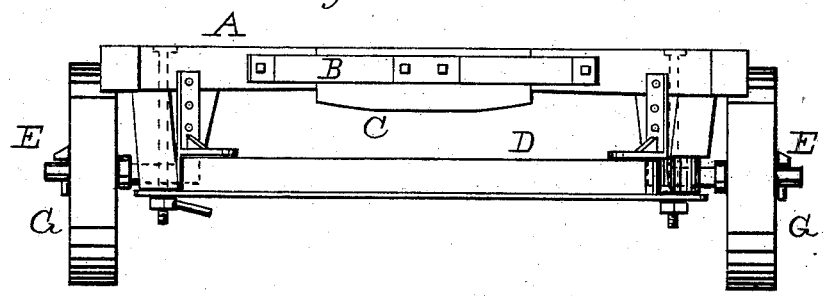

(No Model.) 2 Sheets—Sheet 1.

H. CLAYTON.
TRUCK FOR MOVING REAPERS.

No. 268,867. Patented Dec. 12, 1882.

Witnesses
John Trautmann
Leopold Leibold

Inventor
Henry Clayton
By B. Pickering
Atty.

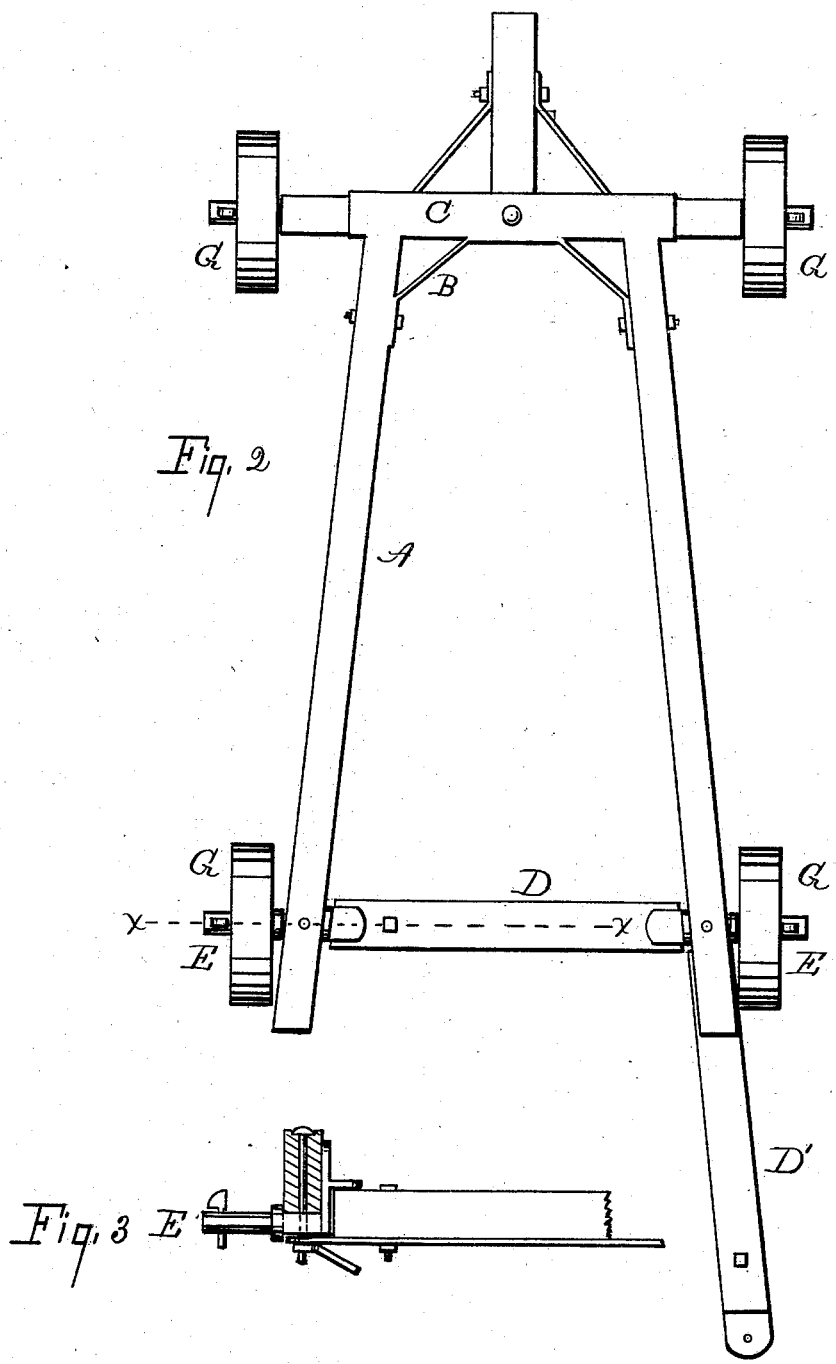

UNITED STATES PATENT OFFICE.

HENRY CLAYTON, OF DAYTON, OHIO.

TRUCK FOR MOVING REAPERS.

SPECIFICATION forming part of Letters Patent No. 268,867, dated December 12, 1882.

Application filed September 29, 1882. (No model.)

*To all whom it may concern:*

Be it known that I, HENRY CLAYTON, a citizen of the United States, residing at Dayton, in the county of Montgomery and State of Ohio, have invented a certain new and useful Improvement in Trucks for Moving Reapers; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in trucks for moving reapers; and it consists of a detachable axle and a spindle suited for attachment to the axle and frame, as will be hereinafter fully set forth. I attain the object by the mechanism illustrated in the accompanying drawings, in which—

Figure 1 is a rear view of the truck. Fig. 2 is a top view of the same. Fig. 3 is a section of the frame on line $x$, with the contiguous parts complete.

A represents a wooden frame, consisting of two rails attached to the bolster C at the forward end and stayed by the iron brace B. Near the back end of the rails are attached blocks to elevate the frame above the wheels G.

The spindle E is made of cast-iron, and consists of the spindle proper, a stump-axle, a vertical plate-projection, and a horizontal projection. Through the axle and vertical part it is bolted to the frame.

The detachable cross-bar or axle consists of an iron bar to which is attached a bar of wood. This axle is secured by long bolts which pass through the rail, block, stump-axle, and iron bar, and is held by a nut. When the nuts are in their normal position the top of the axle bears against the horizontal projections of the stump-axle, and thus the rear part of the frame is fixedly held. The left is a handled nut, so that it may be easily moved when it is desirable to turn the axle aside. The rear part of the right block is rounded, so as to admit of the axle swinging to the rear, as illustrated at D', Fig. 2.

The operation of loading a reaper is thus described: The handled nut to the left is removed and the axle is swung around to the rear. Then the truck is backed under the reaper, which has been elevated for the purpose, the axle is swung back in position and secured, the reaper is lowered, and the loading is completed. In this manner reapers may be loaded for transportation and unloaded with but little effort.

Having fully described my invention, what I desire to secure by Letters Patent is—

The spindle E, with stump-axle, vertical and horizontal projections, in combination with the detachable axle D and frame A, substantially as set forth.

In testimony that I claim the foregoing as my own I affix my signature in presence of two witnesses.

HENRY CLAYTON.

Witnesses:
B. PICKERING,
JOHN HANITCH.